May 25, 1943.
B. R. GRACE
2,320,075
RANGEFINDER FOR MEASURING AND INDICATING THE DISTANCE BETWEEN TWO POINTS
Filed Aug. 18, 1941
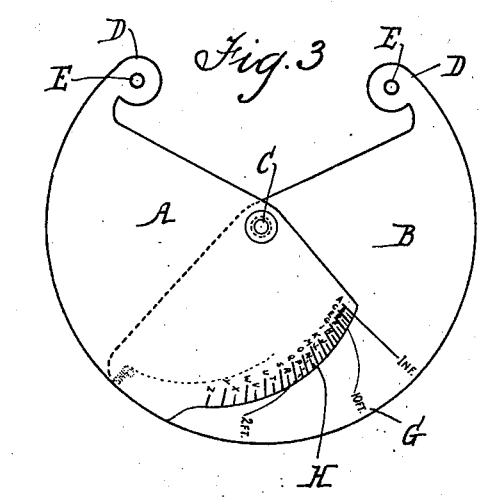
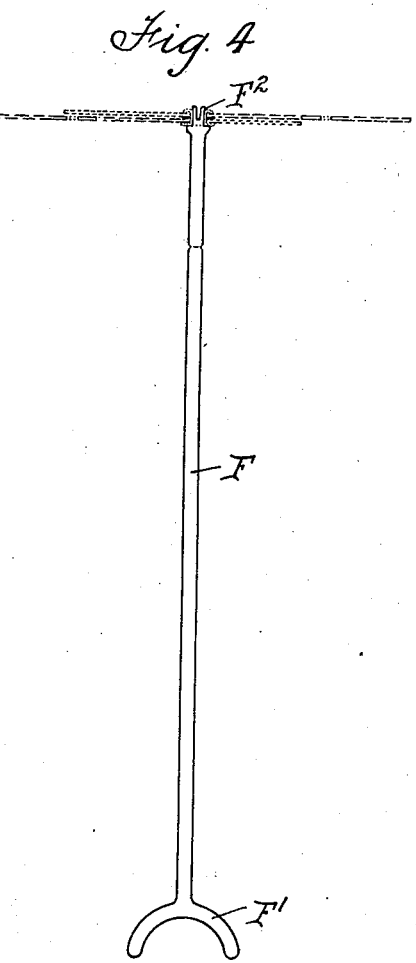
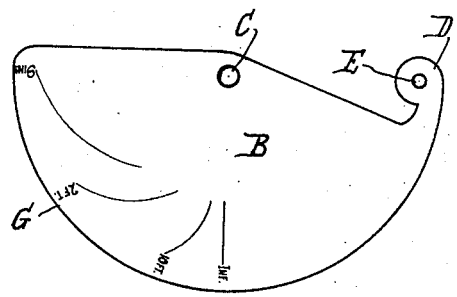
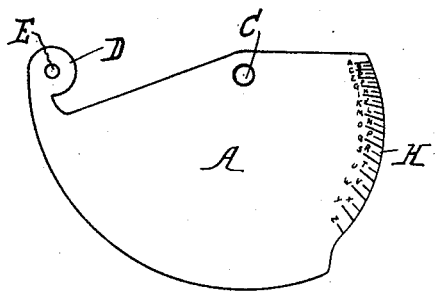
INVENTOR
BRUCE RAYMOND GRACE
BY
Young, Emery & Thompson
ATTYS Patented May 25, 1943

2,320,075

UNITED STATES PATENT OFFICE 2,320,075

RANGEFINDER FOR MEASURING AND INDICATING THE DISTANCE BETWEEN TWO POINTS

Bruce Raymond Grace, Auckland, New Zealand

Application August 18, 1941, Serial No. 407,375
In New Zealand December 18, 1940

3 Claims. (Cl. 33—64)

This invention has been devised with the object of providing improved means for use in ascertaining the distance between any two points, which means are particularly useful in respect of photographic operations in the determination of the distance from the camera of any subject in order that the camera may have its focus accurately arranged for photographing such subject. The means devised may, however, be used in respect of any other operations in which distances of objects from a defined point have to be ascertained.

The invention relates to a novel construction of means adapted for use in that known method of measuring and indicating distances in which two vision sights are provided and are adapted to be held in front of the operator's two eyes, one in front of each eye, and such sights are capable of being moved away from and towards each other and in so doing are capable of bringing the object into coincidental vision alignment with the two eyes as the object is sighted by the eyes across or through the respective sights. In this operation the sights require to be moved farther apart or closer together in order to effect this coincidence in the visual alignment in correspondence with the distance away of the object, and thus by a system of calibration the various distances away of the object, as represented by the distances apart of the two sights, may be indicated upon the device employed.

It is a known physical fact that the distances between the eyes of persons vary to some extent. Consequently the adjustment of the sights in a particular device to obtain a vision alignment on an object at any defined distance that will result from the use of the device by one person, will vary from the adjustment needed to bring about a similar result with another person having eyes which are spaced at a different distance apart. Or, more explicitly stated, the sight base in different people varies and the sights of the device have to be adjusted at different distances apart to effect their visual alignment upon an object at any defined distance away.

Therefore the distances calibration of the device that would be suitable for a person having a particular sight base would not be suitable for a person having a different sight base. A particular feature of this invention is the provision therein of distance calibrations designed to be used in conjunction with a series of indicator markings so as to be suitable for different sight bases.

In this invention the device designed for giving effect thereto comprises the employment of two plates made of suitable stiff material, each having a sight embodied therein, and which plates are so mounted or connected face to face one with the other that they may slide or move relatively to cause the sights to be positioned at varying distances apart. The two plates are also so associated that portions of their surfaces are in overlapping engagement, and on the respective edges of these overlapping parts the distance scale markings and the indicator scale markings before referred to are arranged, so that as the plates are relatively moved in the adjustment apart of the sights, the one set of markings moves across the other set.

In the most convenient form of the invention the device is comprised of two flat plates of approximately semi-circular form that are mounted face to face upon a central axial pin so that they may turn one upon the other to overlap more or less. Each plate is formed with, or provided with, a sight at one of its corners and the two plates are so arranged relatively that these sights are disposed in opposite relationship in respect of the axis on which they turn and at equal radial distances from such axis. The sights may thus be moved apart or together by turning the plates on their axis and in this movement the plates are caused to overlap more or less. The overlapping edges are provided with the distance scale and the indicator scale markings before referred to and which will be hereinafter more fully described.

The invention also comprises means for use in conjunction with this device for keeping the device in position for use the correct distance in front of the user's eyes, which means also will be hereinafter more fully described.

In fully describing the invention, reference will be made to the accompanying sheet of drawings wherein is illustrated the aforesaid form of the invention, and in which—

Figure 1 is a face view of one plate member of the said device.

Figure 2 is a face view of the other plate member thereof.

Figure 3 is a face view of the device in assembled condition.

Figure 4 is a view of the holder for the device showing in dotted lines the device in position thereon.

In giving effect to the invention according to the form shown, two plates A and B are provided, these being made of approved stiff material but suitably of thin metal sheet and these plates are formed approximately of semi-circular shape and are secured together, face to face by means of an eye forming stud or rivet C upon which the plates may turn. The respectively opposite corners of the two plates, that is relatively to the stud C, are formed or provided with sight extensions D made in any approved manner, as for instance in the manner shown by which each is formed with a sighting aperture E. These sights may thus, by turning the plates on their stud C, be brought closer together or moved further apart in the use of the device in the manner before-described, so that the vision of the user's two eyes may be aligned on an object through the respective sights.

The means shown in the drawings for keeping the device in correct position for use, comprises a rod F of approved length, and preferably flexible or collapsible, though rigid in use, having at its back end a bridge F¹ for fitting on to the nose of the operator and at its front end, a journal pin F² on to which the eye of the stud C of the device may fit so that the plates A and B extend across the end in the manner represented by the dotted lines in Figure 4. When the range finder is held in the operator's hands so that the bridge F¹ of rod rests on his nose and the rod extends horizontally, the plates A and B may be adjusted to bring the sights D before the respective eyes of the operator and then to align the vision through both, on to the object whose distance away is to be ascertained.

In this adjustment of the sights D the main parts of the plates A and B which overlap, move one upon the other in accordance with the amount of adjusting movement required. Consequently this movement may be scaled on the overlapping parts and to afford facility for this, the peripheral edge of the one plate A is shaped at its end remote from its sight D so that it leaves exposed the surface at the edge of the overlapped portion of the plate B. Consequently scale markings may be made on the faces of the two parts, which markings are exposed to view with those on the one plate moving relatively in respect to those on the other plate.

In the simpler form of the device in which it is intended for use by individuals having approximately the same breadth of vision, the distances may be calibrated on one plate B as at G, to move in relation to a single marking on the plate A. But in its preferred form, provision is made for the device being adapted to give distance indications in relation to different breadths of vision or sight bases as affected by the different physical differences between individuals and the consequent different adjustments required to align the sights on an object a defined distance away, when it is used by different persons. This difference of sight bases among individuals is provided for in the range finder by a plotting of a scale in such a way that all variations of sight base are provided for covering the whole range of known human variations in sight base. For this purpose the single marking on the plate A is replaced by a scale such as that shown at H and this scale is arranged along the plate edge to move across the distance markings on the plate B. Such scale is plotted by the adjustment of the edge of A in relation to any fixed distance of the scale upon the plate B and at the varying distances apart of the sights D in relation to such distance and these markings on the plate A may be given indicator characters of different natures as for instance the letters of the alphabet, in order, as shown. The user of the device would require to know which marking is appropriate to his vision breadth, and for that purpose will take a sight upon an object at a defined distance and will note the marking on the scale H which coincides with that distance marking on the scale G. This marking on the scale H will then become his key indicator in respect to his general use of the device.

It will readily be understood that the construction of the device may be varied as to its details as to the shape of the plates and the manner of associating them together in order to obtain the relative movement of one in relation to the other and the overlapping scale marked edges, without departing from the general features of this invention.

I claim:

1. A range finder comprising a pair of plates each provided with a sighting element said plates being arranged in partly overlapping relationship with their sighting elements spaced from each other and being relatively movable to enable an object to be sighted by the two eyes of an observer through said sighting elements, and means for maintaining said elements during sighting at a predetermined distance from the eyes of the observer whereby the range of the object is determinable from the said distance and the distance between the sighting elements, one of said plates having a calibrated scale of range distances thereon and the other of said plates having thereon a plurality of indicia for applying correction for variation of interpupillary distance in the observers said indicia moving across said scale when the plates are relatively pivoted in sighting.

2. A range finder according to claim 1 in which the maintaining means comprise a rod having a nose bridging member at one end and means at the other end for removably supporting the plates and sighting means for relative pivotal movement across the line of sight.

3. A range finder comprising a pivot pin, two flat plates each of approximately segmental shape rotatably mounted in partly overlapping relationship on said pin and having a sighting means at its outer corner, said plates having respectively on their overlapping portions a calibrated scale of range distances and indicia of interpupillary distance in the user, and means for holding the sighting means at a predetermined distance from the eyes of the user, said holding means including a rod having a nose bridging member at one end and means at the other end for removably receiving the pivot pin of the plates to cause the latter to extend in a plane transversely to the rod.

BRUCE RAYMOND GRACE.